US012197938B1

(12) United States Patent
Saidi et al.

(10) Patent No.: US 12,197,938 B1
(45) Date of Patent: Jan. 14, 2025

(54) DATA MIGRATION WITH METADATA

(71) Applicant: Amazon Technologies, Inc., Seattle, WA (US)

(72) Inventors: Ali Ghassan Saidi, Austin, TX (US); Adi Habusha, Alonei Abba (IL)

(73) Assignee: Amazon Technologies, Inc., Seattle, WA (US)

( * ) Notice: Subject to any disclaimer, the term of this patent is extended or adjusted under 35 U.S.C. 154(b) by 364 days.

(21) Appl. No.: 17/643,756

(22) Filed: Dec. 10, 2021

(51) Int. Cl.
- G06F 9/455 (2018.01)
- G06F 13/16 (2006.01)
- G06F 13/42 (2006.01)

(52) U.S. Cl.
CPC ...... *G06F 9/45558* (2013.01); *G06F 13/1673* (2013.01); *G06F 13/4221* (2013.01); *G06F 2009/4557* (2013.01); *G06F 2009/45579* (2013.01); *G06F 2213/0024* (2013.01)

(58) Field of Classification Search
None
See application file for complete search history.

(56) References Cited

U.S. PATENT DOCUMENTS

| | | | | |
|---|---|---|---|---|
| 5,465,342 A * | 11/1995 | Walsh | ................. | G06F 12/0864 711/119 |
| 6,112,226 A * | 8/2000 | Weaver | ................. | H04N 19/162 375/E7.199 |
| 6,260,044 B1 * | 7/2001 | Nagral | ................. | G06F 9/451 707/999.102 |
| 6,438,653 B1 * | 8/2002 | Akashi | ................. | G06F 12/0864 711/128 |
| 7,100,152 B1 * | 8/2006 | Birum | ................. | G06F 11/3466 717/124 |
| 8,832,325 B1 * | 9/2014 | George | ................. | G06F 3/067 710/21 |
| 8,880,821 B1 * | 11/2014 | Li | ................. | G06F 3/067 711/170 |
| 10,848,555 B2 * | 11/2020 | Golander | ................. | G06F 16/00 |
| 11,093,442 B1 * | 8/2021 | Bhutani | ................. | G06F 16/119 |
| 11,372,828 B1 * | 6/2022 | Bendapudi | ................. | G06F 16/258 |
| 2004/0059783 A1 * | 3/2004 | Kazui | ................. | H04N 21/4622 715/756 |
| 2005/0256908 A1 * | 11/2005 | Yang | ................. | G06F 16/258 |
| 2005/0278492 A1 * | 12/2005 | Stakutis | ................. | G06F 11/2082 711/161 |

(Continued)

*Primary Examiner* — Adam Lee
(74) *Attorney, Agent, or Firm* — Weaver Austin Villeneuve & Sampson LLP

(57) ABSTRACT

An input/output (I/O) device can initiate data migration of a virtual machine (VM) instance from a source device to a target device. The data migration of the VM instance may include migrating the data for the VM instance and tag data associated with the data. The data for the VM instance and the tag data may be stored together in a source memory. A first read request from the I/O device can enable a memory controller in the source device to read the data for the VM instance and the tag data together, store the tag data in a tag data buffer, and transmit the data for the VM instance to the target device. A second read request from the I/O device can read the stored tag data from the tag data buffer and transmit to the target device. The target device can write the data for the VM instance together with the tag data in the target memory.

20 Claims, 8 Drawing Sheets

(56) References Cited

U.S. PATENT DOCUMENTS

| | | | |
|---|---|---|---|
| 2009/0210431 A1* | 8/2009 | Marinkovic | G06F 16/1827 709/227 |
| 2009/0281847 A1* | 11/2009 | Hamilton, II | G06Q 10/0637 707/E17.002 |
| 2014/0082120 A1* | 3/2014 | Ma | G06F 15/16 709/213 |
| 2014/0258627 A1* | 9/2014 | Jackson | G06F 9/384 711/125 |
| 2015/0033220 A1* | 1/2015 | Venkat | G06F 9/45558 718/1 |
| 2016/0085670 A1* | 3/2016 | Huang | G06F 13/1673 711/154 |
| 2017/0286512 A1* | 10/2017 | Zhang | H04L 67/1095 |
| 2018/0307426 A1* | 10/2018 | Sakai | G06F 3/0689 |
| 2020/0034175 A1* | 1/2020 | Calciu | G06F 9/45558 |
| 2021/0049099 A1* | 2/2021 | Turner | G06F 12/0246 |
| 2021/0173659 A1* | 6/2021 | Yuan | G06N 3/063 |
| 2021/0208968 A1* | 7/2021 | Lavine | G11C 29/36 |
| 2022/0092024 A1* | 3/2022 | Kavaipatti Anantharamakrishnan | G06F 16/125 |
| 2022/0100547 A1* | 3/2022 | Yamamoto | G06F 3/0604 |
| 2022/0107747 A1* | 4/2022 | Ebara | G06F 3/0611 |

* cited by examiner

DATA MIGRATION WITH METADATA

BACKGROUND

Data migration is generally performed to move data from one physical system to another for a variety of reasons including boosting system performance, upgrading or maintaining system hardware, or application migration. Live migration may include moving a running virtual machine instance or application between different physical machines. In most cases, data associated with the virtual machine instance is transferred from the current host machine to a target host machine without disconnecting the client or the application.

BRIEF DESCRIPTION OF THE DRAWINGS

Various embodiments in accordance with the present disclosure will be described with reference to the drawings, in which.

DETAILED DESCRIPTION

Figure 1:
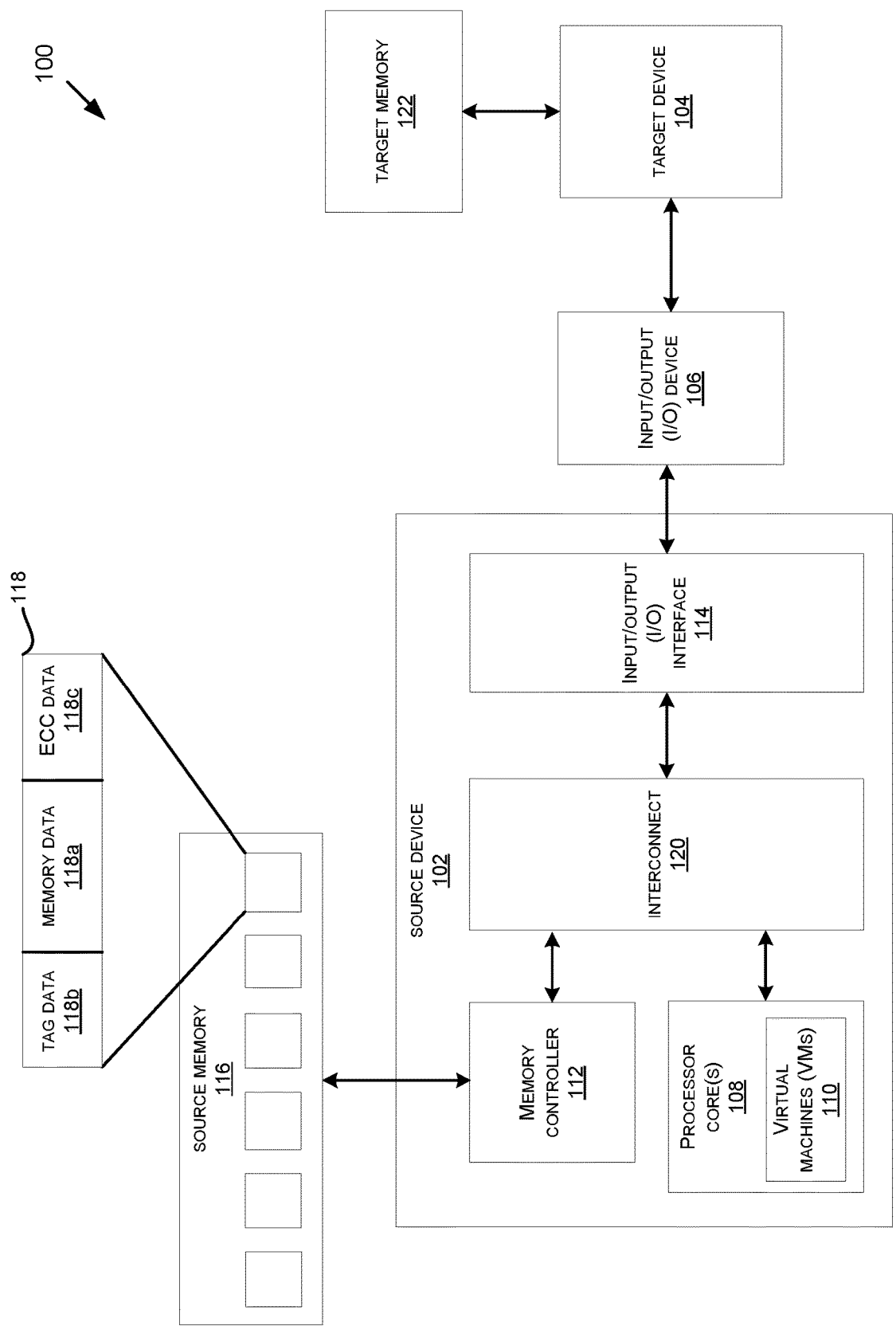
FIG. 1 illustrates a system, which can be used to describe data migration between a source device and a target device.

Virtualization can allow execution of multiple virtual machine (VM) instances on the same physical machine to meet growing demand for storage, computing, and communication resources required by the modern-day applications. In order to manage various resources efficiently, virtualization techniques may sometimes rely on VM migration to perform load balancing, fault tolerance, power management, online system maintenance, and resource sharing, among others. Live VM migration can allow migrating a VM instance between different physical machines without disconnecting the application or the client. During live migration, contents of the memory associated with a VM instance can be migrated from the source (or current) host machine to the target host machine.

Some systems may store one or more additional bits of metadata for every chunk of memory. As an example, some processor architectures may store a 4-bit tag with every 16 bytes of physical memory. An example of such tag data can be Memory Tagging Extension (MTE) bits used in some ARM based systems. MTE can be used to increase the memory safety of code execution. For example, the MTE bits can act as a key to access a memory location. Proactively detecting memory safety violations using MTE can prevent a large class of security vulnerabilities from being exploitable. However, when the data migration is performed for a VM instance, the metadata for the tag may have to be migrated along with the data associated with the VM instance from the source memory in the source host machine to the target memory in the target host machine.

The data associated with the VM instance (or simply "the VM instance data") and the corresponding metadata for the tag (or simply "the tag data") may be co-located in the same memory device, or located in separate memory devices. When the VM instance data and the corresponding tag data are stored in separate memory devices, separate memory accesses may be required to read the VM instance data and the corresponding tag data, which can affect the memory bandwidth and degrade system performance. When the VM instance data and the corresponding tag data are co-located in the same memory device, a read transaction to the memory device can read both the VM instance data as well the tag data. However, in both implementations, the tag data is provided from the memory controller to the processor, and an input/output (I/O) device performing the live migration may not have direct access to the tag data. Furthermore, the I/O bus width may not be wide enough to support transporting the extra tag data together with the VM instance data. To obtain the tag data for the live migration, the I/O device may have to read the memory twice. For example, the I/O device may perform a first read access to the memory to read the VM instance data and the corresponding tag data to obtain the VM instance data, and a second read access to the memory to read the VM instance data and the corresponding tag data to obtain the tag data.

Embodiments can provide systems and methods to efficiently transport the tag data when migrating the VM instance data from a source device to a target device. For example, the VM instance data and the tag data may be co-located in a source memory. In some embodiments, the I/O device, which is configured to initiate the data migration of the VM instance from the source device to the target device, can send a first read request to read the VM instance data from the source memory. A source memory controller in the source device can read the VM instance data and the tag data together from the source memory, and temporarily store the tag data in a source tag buffer, which is accessible to the I/O device. The I/O device can send a second read request to read the tag data from the source tag buffer, and send the tag data to the target device.

The I/O device can also send a write request to the target device to write the VM instance data together with the tag data. In some embodiments, the target device may temporarily store the tag data in a target tag buffer and a target memory controller can write the tag data from the target tag buffer together with the VM instance data received from the source device into a target memory. Thus, by implementing a tag buffer that is accessible by the I/O device, the tag data can be transferred from the source memory to the target memory when migrating the VM instance data.

The source device can determine that a read request is for the data migration based on an indication from the I/O device. In some embodiments, a first read request may include an address alias to indicate that the first read request is to initiate the data migration and a second read request may include an address alias to indicate that the second read request is to read the tag data from the source tag buffer. For example, the I/O device may indicate that the first read request is to initiate the data migration using one or more address bits (e.g., if a most significant bit (MSB) of the address is set to 1). In some embodiments, the I/O device can be a PCIe device, such as a network interface card (NIC), and the data migration indication can be implemented using a specific bus device function (BDF) that is designated for data migration. The source device can generate a first data migration command to read the VM instance data and the tag data together from the source memory based on the first read request, and a second data migration command to read the tag data from the source tag buffer based on the second read request. In some embodiments, the indication for the data migration can be in the form of a signal that can accompany the first read request and the second request.

Similarly, the target device can determine that the write request is to write the VM instance data and the tag data for the data migration based on an indication from the I/O device. For example, the I/O device can indicate the data migration using the address or the specific BDF. In some embodiments, the source device and the target device can be coupled using a single I/O device (e.g., when the I/O device acts as a hub), or the source device and the target device can each have a respective I/O device that are communicatively coupled with each other (e.g., via a network).

In some embodiments, the VM instance data and the tag data may be stored in separate memory devices coupled to the source device. In this case, reading the VM instance data and the tag data from the separate memory devices may require separate memory accesses by the memory controller. Similarly, in some embodiments, the VM instance data and the tag data may be migrated to separate memory devices coupled to the target device. The VM instance data and the tag data can also be co-located in the source memory, or stored together in the target memory after data migration. Note that although MTE is described as one example of the tag data, the tag data can include other types of metadata that is not re-constructable from the data itself. For example, the tag data can be used to tag a memory location to indicate what type of data is stored at the location.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates a system 100, which can be used to describe data migration between a source device 102 and a target device 104.

The source device 102 may include one or more processor cores 108, a memory controller 112 and an I/O interface 114 configured to communicate via an on-chip interconnect 120. The source device 102 may be coupled to a source memory 116. The source device 102 may also include other components based on the functionality supported by the source device 102, which are not shown here for ease of discussion. The target device 104 may also include one or more processor cores, memory controllers, I/O interfaces, interconnects, and any other components based on the functionality supported by the target device 104. The target device 104 may also be coupled to a target memory 122.

Each of the source device 102 and the target device 104 may include a computing device, which may be configured to support execution of one or more VM instances associated with one or more applications or clients. For example, the processor core(s) 108 may be configured to execute one or more VMs 110, which may be managed by a hypervisor (not shown).

In some cases, a VM instance from the VMs 110 executing on the source device 102 may have to be migrated to the target device 104 to improve performance, perform power management, manage computing resources, fix hardware issues, or for other reasons. In most cases, data migration can be performed for live migration of a VM instance from the source device 102 to the target device 104 without disconnecting the application or the client. During the live migration, contents of the memory associated with the VM instance can be migrated from the source device 102 to the target device 104. In various implementations, the source device 102 and the target device 104 can be part of different physical machines (e.g., servers), which can be located on the same or different racks.

In some systems, an I/O device 106 may be configured to initiate data migration for the VM instance from the source device 102 to the target device 104. The I/O device 106 can be a network controller, a network adapter, a network interface card, or any other suitable I/O device, which can facilitate communication between the source device 102 and the target device 104 for data migration and other tasks. In some implementations, the I/O device 106 may provide a network connection to communicate with a remote server, where the target device may be located. In some implementations, the I/O device 106 may be a PCIe device which can communicate with the I/O interface 114 based on a PCIe protocol.

The source memory 116 may include a plurality of memory chunks, which may be configured to store data associated with the VMs 110 executing on the source device 102. The source memory 116 and the target memory 122 can include DRAM, SDRAM, DDR SDRAM, SRAM, or any suitable type of memory. FIG. 1 shows an example memory chunk 118, which can store data associated with a VM instance. The memory chunk 118 may comprise memory data 118*a*, tag data 118*b*, and ECC data 118*c*. The memory data 118*a* may include data or payload associated with the VM instance.

In some examples, the tag data 118*b* may include ARM's memory tagging extension (MTE) bits associated with the memory data 118*a*, which can be used to detect and mitigate memory safety violations. In some implementations, a lock can be implemented on each memory chunk by tagging each 16 bytes of physical memory with 4 bits of metadata. In other implementations, a different ratio of tag data bits to memory data bytes can be used (e.g., to adjust the number of unique tags available). A key can be provided during memory access, which can be compared with the lock (e.g., the tag data). The memory access can be denied, and an error can be reported when the key does not match with the lock. The key can be provided as part of the pointer or the virtual address of the transaction. The MTE bits can be generated using a random seed, a pseudo-random seed, or any suitable mechanism.

The ECC data 118*c* can be used to detect and correct data corruption in the source memory 116. In some implementations, 4 bytes of ECC data can be provided for each 16 bytes of physical memory data. In other implementations, a different ratio of ECC bytes to data bytes can be used (e.g., to adjust the error correction capability). The ECC data 118*c* can be computed using any suitable algorithm such as Hamming algorithm, Reed-Solomon algorithm, or BCH algorithm. Unlike the ECC data 118*c*, the tag data 118*b* is not derived from the memory data 118a. As such, the ECC data 118c need not be transferred from the source device 102 to the target device 104 during data migration because the ECC data 118c can be recomputed from the data itself by the target device 104.

In some implementations, one or more of the memory data 118a, tag data 118b, and the ECC data 118c may be stored in separate memory devices or memory modules. For example, the memory data 118a may be stored with the ECC data 118c in a first memory module and the tag data 118b may be stored in a separate memory module. In some implementations, the memory data 118a, the tag data 118b, and the ECC data 118c can be stored on the same memory module.

When the data migration is performed to move the memory data 118a for the VM instance from the source memory 116 to the target memory 122, the tag data 118c is also transferred from the source memory 116 to the target memory 122 because the tag data 118c may not be derivable from the data itself. In some systems, the I/O device 106 may perform a read transaction to read the memory data 118a for the VM instance. However, the memory controller 112 typically provides the tag data 118b to the processor 108 and discards the tag data 118b when providing the memory data 118a to other components such as the I/O device 106. As such, a mechanism to provide the tag data 118b to the I/O device 106 is implemented to perform data migration.

Figure 2:
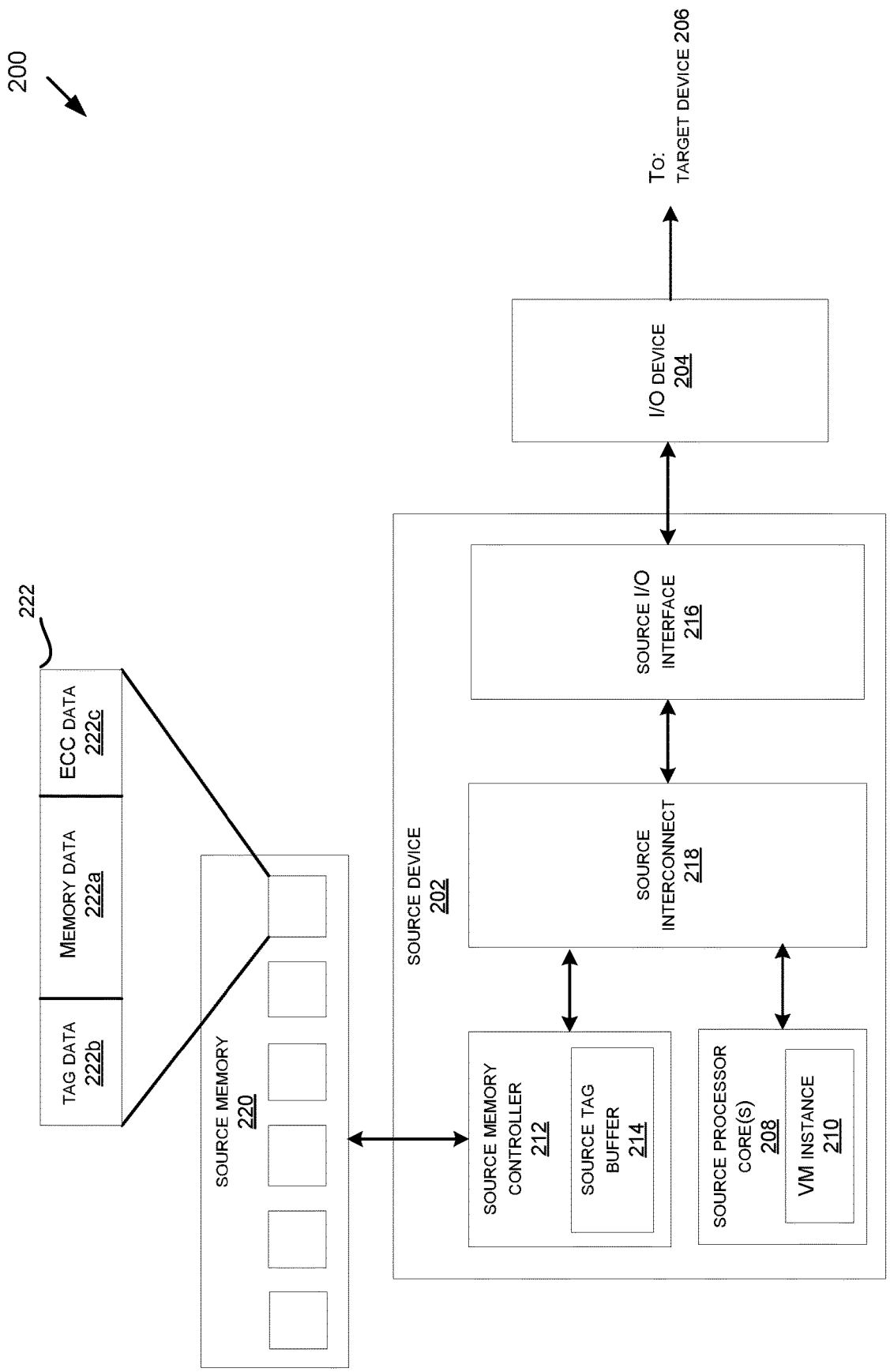
FIG. 2 illustrates a system, which can be used to read tag data and memory data from the source device for the data migration to the target device, according to some embodiments.

FIG. 2 illustrates a system 200, which can be used to read the tag data and the memory data from a source device 202 for data migration to a target device 206, according to some embodiments.

Each of the source device 202 and the target device 206 may include a computing device, which may be configured to provide a virtualization environment to support various applications such as cloud computing, machine learning, artificial intelligence, gaming, high performance computing, web hosting, or application hosting, among others. For example, each of the source device 202 and the target device 206 may support execution of one or more VM instances associated with one or more applications or clients. Each of the source device 202 and the target device 206 may include a system-on-a-chip (SoC) or other suitable integrated circuits based on the functionality supported by the system 200.

The source device 202 may be coupled to a source memory 220 and to an I/O device 204. The I/O device 204 can be a network controller, a network adapter, a network interface card, or any other suitable I/O device, which may be configured to initiate data migration from the source device 202 to the target device 206. The source memory 220 may store data associated with one or more VM instances executing on the source device 202 in multiple data chunks of a certain size (e.g., 16 bytes), as discussed with reference to FIG. 1. An example memory chunk 222 may comprise memory data 222a, tag data 222b, and ECC data 222c as shown in FIG. 2. The source memory 220 may also store other data based on the functionalities supported by the source device 202. The source memory 220 may include DRAM, SDRAM, DDR SDRAM, SRAM, or any suitable type of memory. The memory data 222a, tag data 222b, and the ECC data 222c may be similar to the memory data 118a, tag data 118b, and the ECC data 118c, respectively, as discussed with reference to FIG. 1.

The source device 202 may comprise one or more source processor cores 208, a source memory controller 212, and a source I/O interface 216 coupled to a source interconnect 218. The source memory controller 212 may include a source tag buffer 214, which may be configured to store tag data associated with the memory data for the data migration of the VM instance. Note that the source device 202 may include one or more source memory controllers based on the size and configuration of the source memory 220; however, only the source memory controller 212 is shown in FIG. 2 for ease of discussion. In some embodiments, the source tag buffer 214 may be external to the source memory controller 212. The source processor 208 may be configured to execute one or more VMs, which may be managed by a hypervisor (not shown). In some examples, the source processor 208 can be executing a VM instance 210, which may need to be migrated to the target device 206. The source interconnect 218 can be implemented using buses, meshes, crossbars, matrix, arbiters, nodes, ports, or other suitable components based on the bus protocol(s) supported by the source device 202.

In some embodiments, the target device 206 may be located in a remote server, which may communicate with the I/O device 204 using a target I/O device (not shown in FIG. 2). For example, the target I/O device can be another network device, similar to the I/O device 204. However, for ease of discussion, the I/O device 204 is shown to communicate with both the source device 202 and the target device 206.

In some embodiments, the I/O device 204 may execute a specific instruction to perform the data migration by reading the memory data and the tag data for the VM instance 210 from the source memory 220. For example, the I/O device 204 may initiate the data migration by sending a first read request to the source device 202, which can enable the source memory controller 212 to read the memory data 222a and the tag data 222b together from the source memory 220, and store the tag data 222b at an address corresponding to the source tag buffer 214, which is accessible to the I/O device 204. The I/O device 204 can send a second read request to read the tag data 222b from the source tag buffer 214. The memory data 222a and the tag data 222b can be transmitted to the target device 206 in response to the first read request and the second read request, respectively.

In some embodiments, the I/O device 204 may transmit a write request to the target device 206, which may indicate writing the memory data 222a and the tag data 222b together at the target device 206. In some examples, the data migration may include migrating a 2 MB page at a time, and, therefore, the source tag buffer 214 may support storing 64 KB of the corresponding tag data 222b for each 2 MB page. The 2 MB region can be available at a known memory location for the I/O device 204 to initiate read transactions allowing alternate 2 MB data reads and 64 KB metadata reads to transfer each 2 MB page.

In various examples, the source memory controller 212 may read a certain size of the memory data at a time from the source memory 220 and store the corresponding tag data in the source tag buffer 214 until a certain size of the tag data has been accumulated in the source tag buffer 214 for migrating to the target device 206. For example, the size of the memory data and the tag data, which may be read together from the source memory 220 or transported to the target device 206 may be determined based on the system architecture supported by the system 200 (e.g., size and configuration of the memory modules in the source memory 220, memory bus width, width of the internal buses, I/O interface, etc.).

In some examples, the I/O device 204 may transmit the first read request to the source device 202 to initiate a data migration to move data from the source memory 220 to a target memory coupled to the target device 206 for the VM instance 210. The source I/O interface 216 may receive the first read request from the I/O device 204 to migrate the data for the VM instance 210. The source I/O interface 216 may determine that the first read request is for the data migration based on an address alias indicated by the first read request. As an example, one or more bits in the address of the first read request may indicate that the first read request is for the data migration for the VM instance 210. The source I/O interface 216 may be configured to generate a first data migration command for the source memory controller 212 in response to determining that the first read request is to initiate the data migration.

The source memory controller 212 may receive the first data migration command and perform a read operation to read the memory chunk 222 comprising the memory data 222a for the VM instance 210, the tag data 222b associated with the memory data 222a, and the ECC data 222c. The source memory controller 212 may store the tag data 222b in the source tag buffer 214 for transmitting to the I/O device 204 for the data migration. The source memory controller 212 may transmit the memory data 222a to the target device 206 via the source I/O interface 216. In some implementations, the memory data 222a may be temporarily buffered in the target device 206, or prior to reaching the target device 206, e.g., in the I/O device 204 and/or in a target I/O device. In some implementations, the source memory controller 212 may use the ECC data 222c to detect and correct any errors associated with the memory data 222a. In some cases, the ECC data 222c may not need to be transmitted from the source device 202 to the target device 206 for the data migration of the VM instance 210, but can be instead recalculated, for example, by a target memory controller in the target device 206 when storing the data being migrated.

In some embodiments, the I/O device 204 may transmit a second read request to the source device 202 to read the tag data 222b associated with the memory data 222a. The second read request may be received by the source I/O interface 216. The source I/O interface 216 may determine that the second read request is also for the data migration based on the one or more bits in the address of the second read request, similar to the first read request. The source I/O interface 216 may generate a second data migration command for the source memory controller 212 to read the tag data 222b from the source tag buffer 214. The source I/O interface 216 may transmit the tag data 222b from the source tag buffer 214 to the I/O device 204. The I/O device 204 may receive the tag data 222b and transmit the tag data 222b to the target device 206.

In some embodiments, the I/O device 204 can be a PCIe device, and the data migration indication can be implemented using a bus device function (BDF). For example, the first read request and the second read request from the I/O device 204 for the data migration can be associated with a specific BDF that can be identified by the source I/O interface 216 to generate the data migration command or message for the source memory controller 212 to read the tag data together with the memory data and temporarily store the tag data in the source tag buffer 214. In some implementations, the source I/O interface 216 may include a PCIe root complex that can recognize the requests from the specific BDF and use the requests associated with the BDF to generate the data migration commands to be sent to the source memory controller 212 via the source interconnect 218.

In some embodiments, the source interconnect 218 may be implemented using a bus protocol that can be similar to the Advanced extensible Interface (AXI) protocol, and the I/O device 204 may use a signal similar to the AXI USER signal to indicate to the source memory controller 212 to read the memory data 222a and the tag data 222b together from the source memory 220.

The target device 206 can be part of the same server rack or a different server rack. In some implementations, the I/O device 204 and the source device 202 can be part of the same server, and the I/O device 204 may communicate with a different I/O device coupled to the target device 206 on a different server. This is further explained with reference to FIG. 3.

Figure 3:
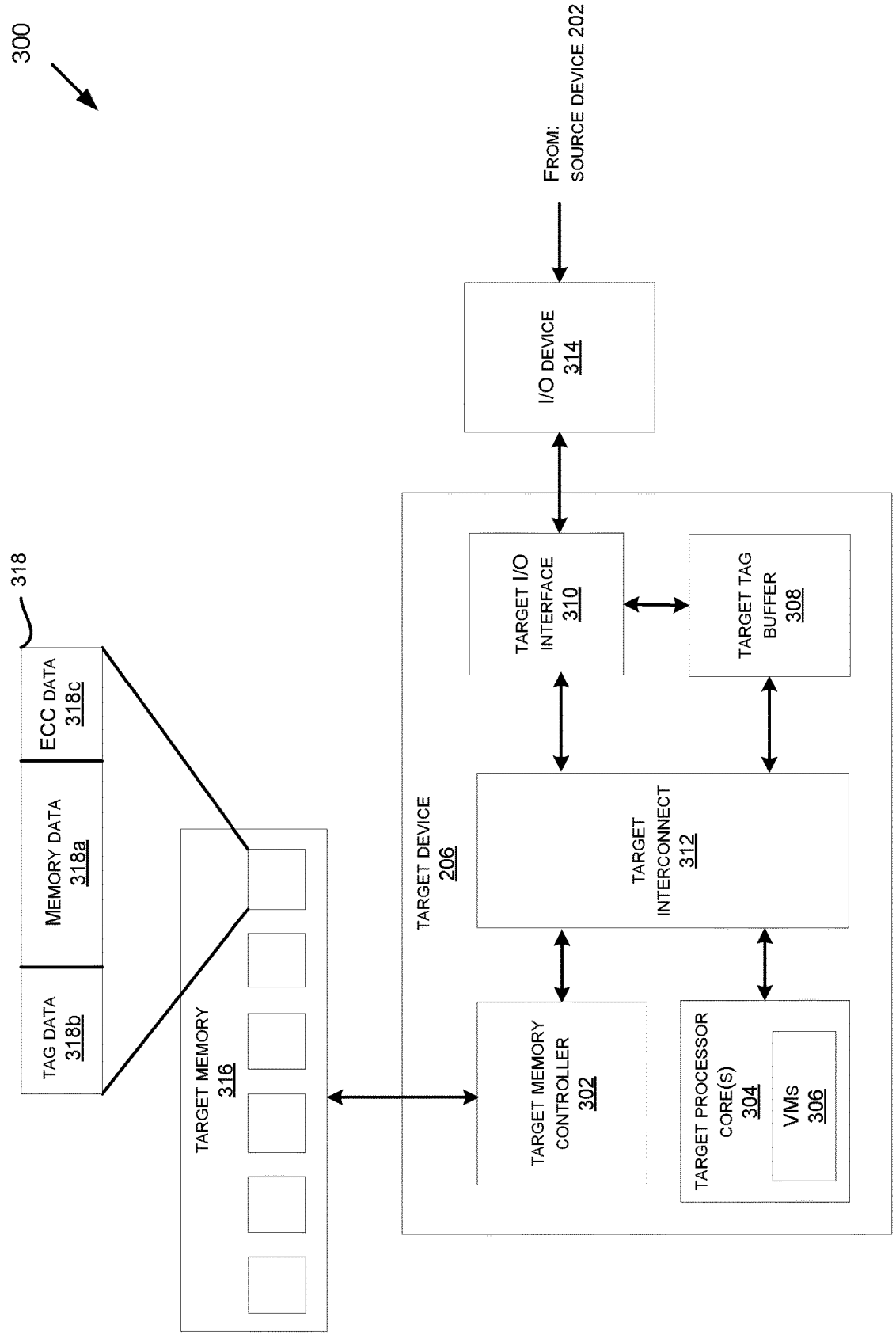
FIG. 3 illustrates a system, which can be used to write the tag data and the memory data together into a target memory for the data migration of a virtual machine (VM) instance, according to some embodiments.

FIG. 3 illustrates a system 300, which can be used to write the tag data and the memory data together into a target memory for the data migration of the VM instance, according to some embodiments.

The system 300 may include the target device 206 coupled to a target memory 316 and an I/O device 314. The target device 206 can be a computing device, which can include an SoC or other suitable integrated circuits based on the functionality supported by the target device 206. The I/O device 314 can be a network controller, a network adapter, a network interface card, or any other suitable I/O device, which can facilitate the data migration for the VM instance 210 executing on the source device 202 to the target device 206. In various implementations, the I/O device 314 can be the I/O device 204 from FIG. 2, or a separate I/O device similar to the I/O device 204 based on the implementation.

The target device 206 may comprise one or more target processor cores 304, a target memory controller 302, a target I/O interface 310, and a target tag buffer 308 coupled to a target interconnect 312. The one or more target processor cores 304 may be configured to support execution of one or more VMs 306. The target tag buffer 308 may be configured to temporarily store the tag data associated with the data for the data migration of the VM instance 210 from the source device 206. The target memory 316 may be configured to store data associated with the migration of the one or more VM instances, and any other data based on the applications executing on the target device 206. The target memory 316 may include DRAM, SDRAM, DDR SDRAM, SRAM, or any suitable type of memory. Note that the target device 206 may include one or more target memory controllers based on the size and configuration of the target memory 316; however, only the target memory controller 302 is shown in FIG. 3 for ease of discussion.

The I/O device 314 may be configured to receive the memory data 222a for the VM instance 210 and the tag data 222b associated with the memory data from the source device 202 (when the I/O device 314 is same as the I/O device 204), or the I/O device 204. The target I/O interface 310 may be configured to receive the memory data 222a for the VM instance 210 and the corresponding tag data 222b, and store the tag data 222b in the target tag buffer 308. In some embodiments, the I/O device 314 may transmit a write request to the target device 206 to write the memory data 222a and the tag data 222b together to the target memory 316 for the data migration of the VM instance 210. The target I/O interface 310 may be configured to determine that the write request is for the data migration based on the address of the write request. As discussed with reference to FIG. 2, one or more bits in the address of the write request may indicate that the write request is for the data migration of the VM instance 210.

In some embodiments, the I/O device 314 can be a PCIe device, and the data migration indication can be implemented using a BDF as discussed with reference to the I/O device 204. For example, the write request from the I/O device 314 can be associated with a specific BDF that can be identified by the target I/O interface 310 to generate a data migration command or message for the target memory controller 302 to write the tag data 222*b* stored in the target tag buffer 308 together with the memory data 222*a* for the VM instance 210 into the target memory 316. In some implementations, the target I/O interface 310 may include a PCIe root complex that can identify the requests from the specific BDF and use a message space associated with the BDF to generate the data migration commands to be sent to the target memory controller 302 via the target interconnect 312.

In some implementations, the target memory controller 302 may generate ECC data for each memory chunk that is being written into the target memory 316 as part of the data migration of the VM instance 210. As shown in FIG. 3, the target memory controller 302 may write a memory chunk 318 comprising memory data 318*a* for the data migration of the VM instance 210, tag data 318*b* associated with the memory data 318*a*, and ECC data 318*c*. The memory data 318*a* can be the memory data 222*a*, and the tag data 318*b* can be the tag data 222*b* being migrated from the source device 202.

Figure 4:
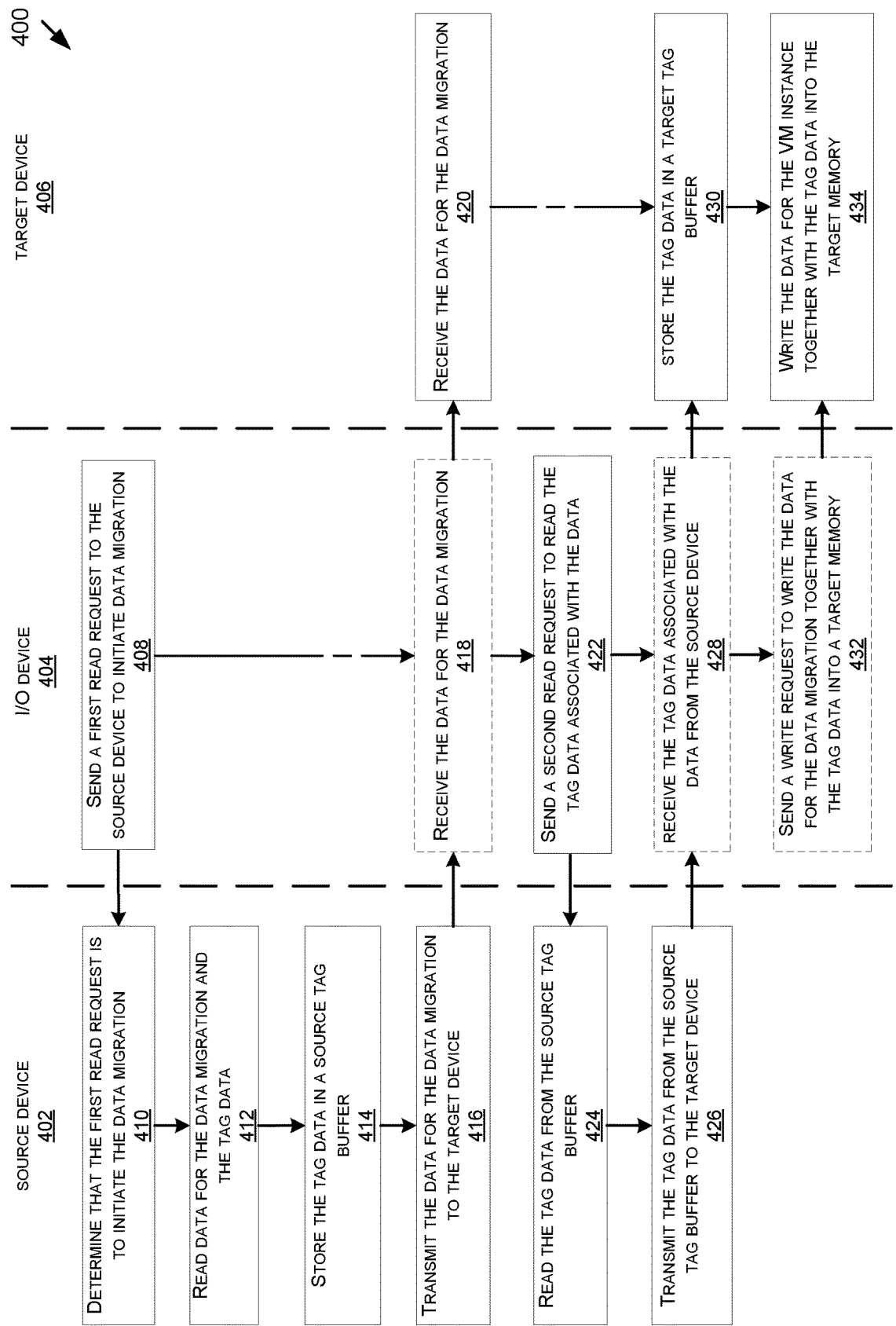
FIG. 4 illustrates a flow diagram for a method to perform data migration by an input/output (I/O) device from a source device to a target device, according to some embodiments.

FIG. 4 illustrates a flowchart 400 for a method to perform data migration by an I/O device 404 from a source device 402 to a target device 406, according to some embodiments. The source device 402 can be an example of the source device 202, the target device 406 can be an example of the target device 206, and the I/O device 404 can be an example of the I/O device 204 (e.g., in this case, the I/O device 204 and the I/O device 314 can be the same device). In step 408, the I/O device 404 can send a first read request to the source device 402 to initiate data migration. The data migration may include moving data for the VM instance 210 from the source memory 220 to the target memory 316. In some embodiments, the first read request may include an address alias to indicate that the first read request is to initiate the data migration. In some embodiments, the I/O device 404 can be a PCIe device and the first read request may be associated with a BDF that may indicate that the first read request is to initiate the data migration.

In step 410, the source device 402 may determine that the first read request is to initiate the data migration. For example, the source I/O interface 216 may determine that the first read request is to initiate the data migration based on the address of the first read request. The source I/O interface 216 may generate the first data migration command for the source memory controller 212 in response to determining that the first read request is to initiate the data migration.

In step 412, the source device 402 may read data for the data migration and the tag data. The source device 402 may read the data for the VM instance and tag data associated with the data from the source memory 220. For example, the source memory controller 212 may read the memory data 222*a* for the VM instance 210, the tag data 222*b* associated with the memory data 222*a*, and the ECC data 222*c* based on the first data migration command. The ECC data 222*c* may be used to detect and correct any errors in the memory data 222*a*.

In step 414, the source device 402 may store the tag data in a source tag buffer. The source memory controller 212 may store the tag data 222*b* in the source tag buffer 214. In some examples, the source memory controller 212 may perform multiple reads of the source memory 220 to migrate one memory page and the corresponding tag data at a time to the target device 406. In some examples, the source memory controller 212 may continue storing the tag data in the source tag buffer 214 until the tag data is ready to be transmitted to the target device 406 (e.g., when a threshold amount of tag data has been stored).

In step 416, the source device 402 may transmit the data for the data migration to the target device 406. The source memory controller 212 may transmit the memory data 222*a* to the target device 206 via the source I/O interface 216. In some implementations, the source I/O interface 216 may transmit the memory data 222*a* to the I/O device 204, which may transmit the data to the target device 206.

In step 418, the data for the data migration may be received from the source device 402. In some implementations, the I/O device 204 may receive the memory data 222*a* for the migration from the source I/O interface 216. In some embodiments, where the I/O device 204 and the I/O device 314 are separate I/O devices (e.g., coupled via a network connection), the I/O device 204 may transmit the memory data 222*a* to the I/O device 314, which may transmit the memory data 222*a* to the target device 206. In some implementations, the I/O device 204 and/or the I/O device 314 may buffer the memory data 222*a* temporarily before transmitting to the target device 206.

In step 420, the target device 406 may receive the data for the data migration. For example, the target I/O interface 310 may receive the memory data 222*a* from the I/O device 204 or the I/O device 314 based on the implementation. In some implementations, the memory data 222*a* may be buffered temporarily in the target device 206 until the tag data 222*b* is obtained, such that the memory data 222*a* and the tag data 222*b* can be written together into the target memory 316. The memory data 222*a* may also be received by the target device 206 after the tag data 222*b* has been obtained. For example, the memory data 222*a* can be buffered at the source device 202, the I/O device 204, the I/O device 314, and/or by the network such that the memory data 222*a* is transmitted to the target device 206 after the tag data 222*b* has been transmitted to the target device 206.

In step 422, the I/O device 404 may send a second read request to the source device 402 to read tag data associated with the data for the data migration. The I/O device 204 may send a second read request to the source I/O interface 216 to read the tag data 222*b* associated with the memory data 222*a* for the data migration. The source I/O interface 216 may determine that the second read request is also for the data migration based on the address alias indication in the second read request, similar to the first read request. The source I/O interface 216 may generate the second data migration command for the source memory controller 212 to read the tag data 222*b* from the source tag buffer 214.

In step 424, the source device 402 may read the tag data from the source tag buffer. The source memory controller 212 may send the tag data 222*b* from the source tag buffer 214 to the source I/O interface 216.

In step 426, the source device 402 may transmit the tag data from the source tag buffer to the target device. The source I/O interface 216 may transmit the tag data 222*b* to the I/O device 204, which can forward the tag data 222*b* to the I/O device 314, or to target device 206 in the absence of the I/O device 314.

In step 428, the I/O device 404 may receive the tag data associated with the data from the source device. In some implementations, the I/O device 204 may receive the tag data 222*b* from the source I/O interface 216. In some embodiments, where the I/O device 204 and the I/O device 314 are separate entities, the I/O device 204 may transmit the tag data 222*b* to the I/O device 314, which may transmit the tag data 222*b* to the target device 206.

In step 430, the target device 406 may store the tag data in a target tag buffer. The target I/O interface 310 may store the tag data 222b in the target tag buffer 308.

In step 432, the I/O device 404 may send a write request to the write the data for the data migration together with the tag data into the target memory. The target I/O interface 310 may receive the write request and determine that the write request is for the data migration based on the address alias indicated in the write request. For example, the target I/O interface 310 may send a data migration command to the target memory controller 302 to write the memory data 222a for the VM instance 210 together with the tag data 222b stored in the target tag buffer 308 into the target memory 316.

In step 434, the target device 406 may write the data for the VM instance together with the tag data into the target memory via the target memory controller. The tag data 222b may be read from the target tag buffer 308 and written into the target memory 316 by the target memory controller 302 along with the memory data 222a.

Figure 5:
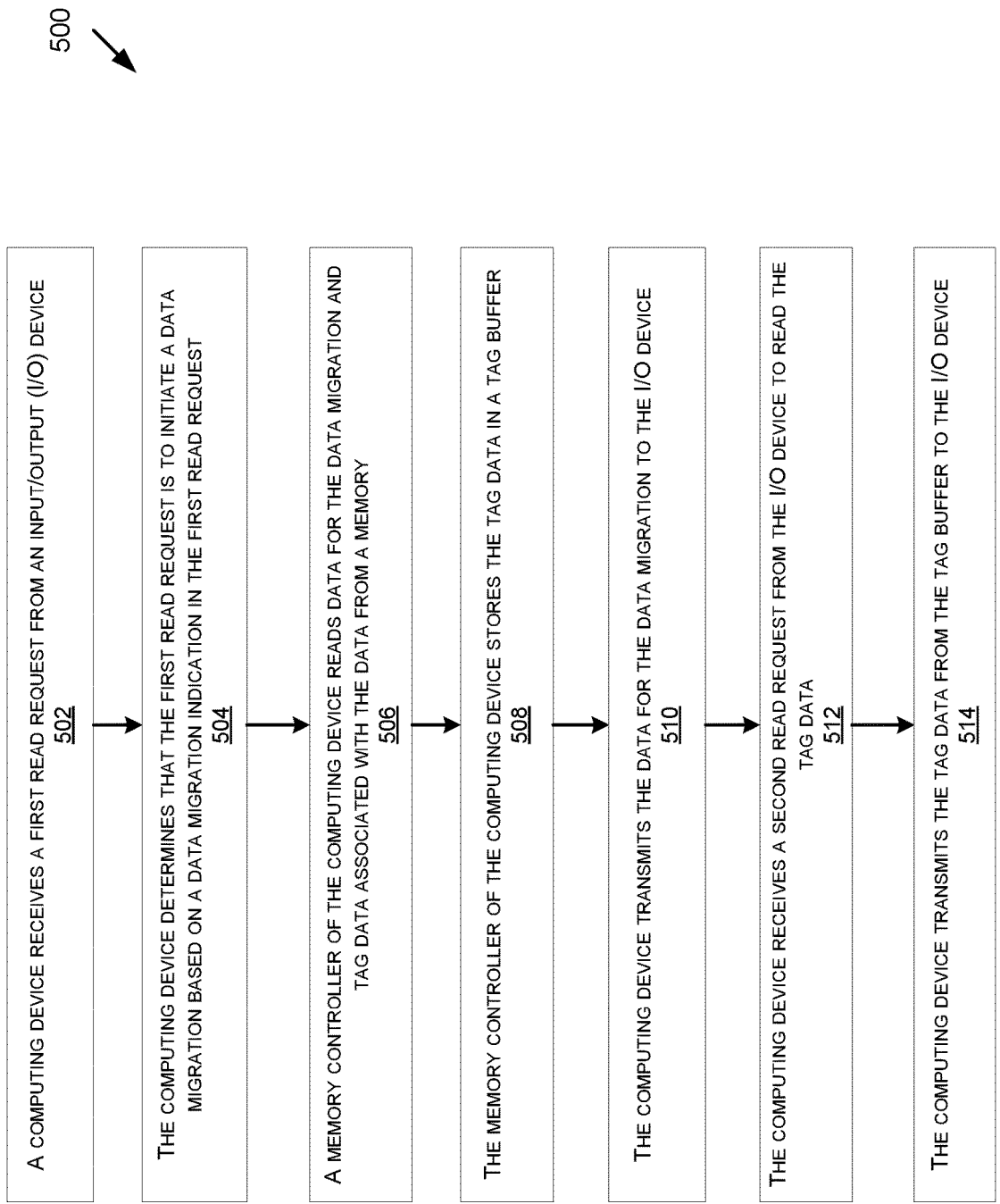
FIG. 5 illustrates a flowchart for a method executed by a computing device for data migration, according to some embodiments.

FIG. 5 illustrates a flowchart 500 for a method executed by a computing device for data migration, according to some embodiments. The computing device can be the source device 202 as described with reference to FIG. 2.

In step 502, the method may include receiving a first read request from an I/O device. As discussed with reference to FIG. 2, the source device 202 may receive the first read request from the I/O device 204 via the source I/O interface 216. In some examples, the first read request may be generated by the I/O device 204 based on an instruction executed by the I/O device 204 for the data migration.

In step 504, the method may include determining that the first read request is to initiate a data migration based on a data migration indication in the first read request. The source I/O interface 216 may determine that the first read request is to initiate a data migration based on a data migration indication in the first read request. The data migration indication may be embedded in an address of the first read request, or the data migration indication may be implemented using a BDF when the I/O device 204 is a PCIe device. The data migration may be initiated to migrate the data for the VM instance 210 from the source memory 220 to the target memory 316. The source I/O interface 216 may be configured to generate the first data migration command for the source memory controller 212 in response to determining that the first read request is to initiate the data migration.

In step 506, the method may include reading, by a memory controller of the computing device, data for the data migration and tag data associated with the data from a memory. The source memory controller 212 may receive the first data migration command and perform a read operation to read the memory data 222a for the VM instance 210, and the tag data 222b associated with the memory data 222a. In some examples, the source memory controller 212 may also read the ECC data 222c, which can be used to detect and correct any errors in the memory data 222a.

In step 508, the method may include storing, by the memory controller of the computing device, the tag data in a tag buffer. The source memory controller 212 may store the tag data 222b in the source tag buffer 214, and send the memory data 222a to the source I/O interface 216 via the source interconnect 218.

In step 510, the method may include transmitting the data for the data migration to the I/O device. The source I/O interface 216 may transmit the memory data 222a to the I/O device 204 for the data migration. The I/O device 204 may transmit the memory data 222a to the I/O device 314, or to the target device 206 if the I/O device 314 and the I/O device 204 are the same entity.

In step 512, the method may include receiving a second read request from the I/O device to read the tag data. The source I/O interface 216 may receive the second read request from the I/O device 204 and determine that the second read request is also for the data migration based on the address alias indication in the second read request. The source I/O interface 216 may generate the second data migration command for the source memory controller 212 to read the tag data 222b from the source tag buffer 214.

In step 514, the method may include transmitting the tag data from the tag buffer to the I/O device. The source I/O interface 216 may transmit the tag data 222b from the source tag buffer 214 to the I/O device 204. The I/O device 204 may receive the tag data 222b and transmit the memory data 222a and the tag data 222b to the target device 206. The target memory controller 302 may write the memory data 222a together with the tag data 222b to the target memory 316. For example, the memory data 318a can be the memory data 222a, and the tag data 318b can be the tag data 222b. In some examples, the ECC data 318c may have been calculated by the target memory controller 302 based on the memory data 318b.

Figure 6:
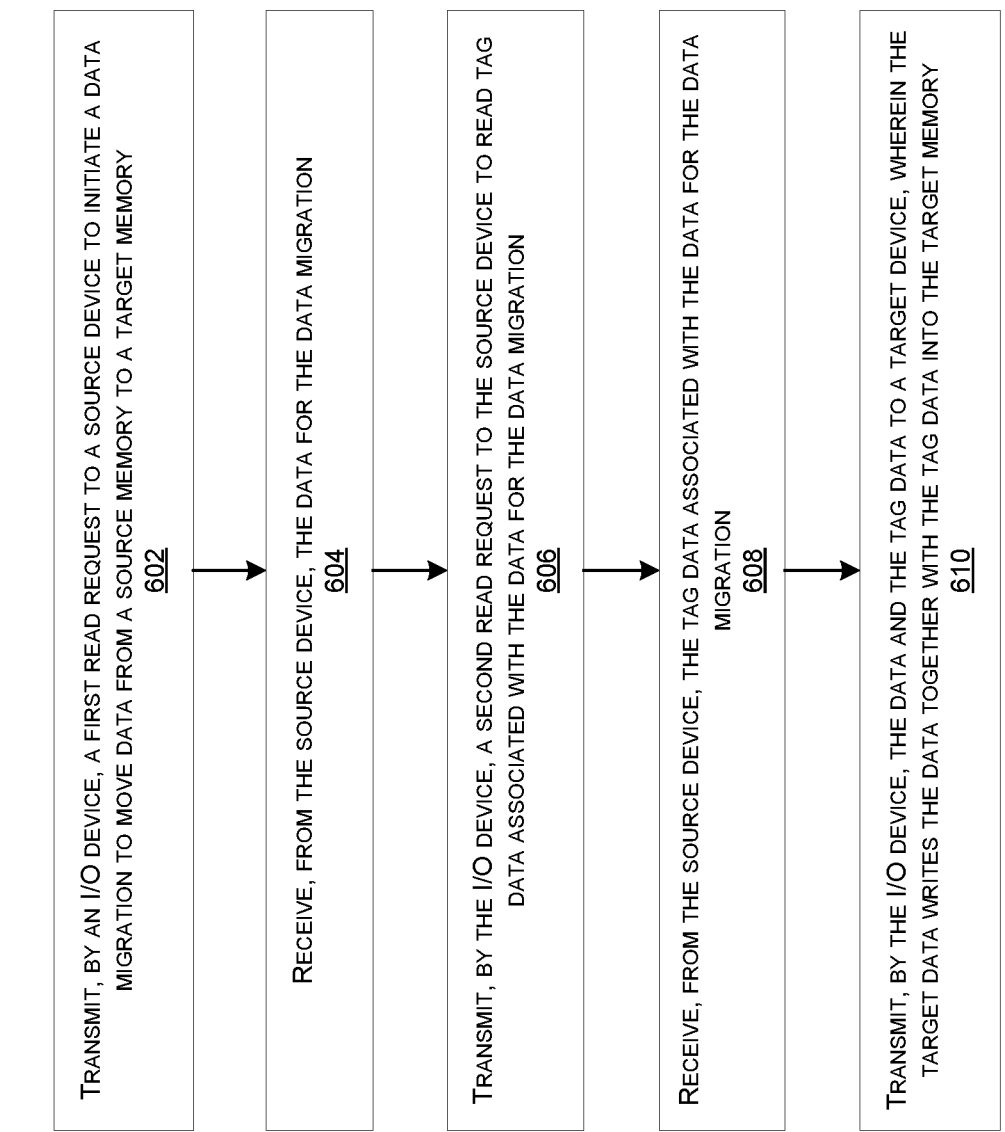
FIG. 6 illustrates a flowchart for a method to facilitate data migration of the VM instance from the source device to the target device, according to some embodiments.

FIG. 6 illustrates a flowchart 600 for a method to facilitate data migration of a VM instance from a source device to a target device, according to some embodiments. In some examples, the data migration may be a live migration of a VM instance executing on the source device 202 to the target device 206.

In step 602, the method includes transmitting, by an I/O device, a first read request to a source device to initiate a data migration to move data from a source memory to a target memory. As discussed with reference to FIG. 2, the first read request may be transmitted by the I/O device 204 to initiate the data migration to move the data from the source memory 220 to the target memory 316. In some implementations, the first read request may include an address alias to indicate that the first read request is to initiate the data migration. In some implementations, the first read request may be transmitted using a BDF designated for the data migration. In response to the first read request, the source memory controller 212 may read the memory data 222a and the tag data 222b together from the source memory 220, and store the tag data 222b in the source tag buffer 214. The memory data 222a may be transmitted to the I/O device 204 by the source I/O interface 216.

In step 604, the method includes receiving, from the source device, the data for the data migration. The memory data 222a may be received from the source I/O interface 216. The memory data 222a may be received by the I/O device 204, which may transmit the memory data 222a to the I/O device 314, or to the target device 206 based on the implementation.

In step 606, the method includes transmitting, by the I/O device, a second read request to the source device to read tag data associated with the data for the data migration. The I/O device 204 may transmit the second read request to read the tag data 222b associated with the memory data 222a for the data migration. The source memory controller 212 may send the tag data 222b from the source tag buffer 214 to the source I/O interface 216.

In step 608, the method includes receiving, from the source device, the tag data associated with the data for the data migration. The tag data 222b may be received from the source tag buffer 214 via the source I/O interface 216. The tag data 222b may be received by the I/O device 204, which may transmit the data to the I/O device 314.

In step 610, the method includes transmitting, by the I/O device, the data and the tag data to a target device. The I/O device 204 may transmit the memory data 222a and the tag data 222b to the target device 206. The target memory controller 302 may write the memory data 222a together with the tag data 222b to the target memory 316 based on the write request sent by the I/O device 204.

As discussed with reference to FIGS. 2-6, various embodiments can be used to efficiently transport the tag data along with the VM instance data for migrating a VM instance from a source device to a target device. In some examples, when the tag data and the VM instance data are co-located in the source memory, the source memory controller can read the tag data together with the VM instance data using a single memory read access. Similarly, the target memory controller can write the tag data together with the VM instance data using a single memory write access. The tag data can be used to store MTE or other types of metadata based on the application.

Figure 7:
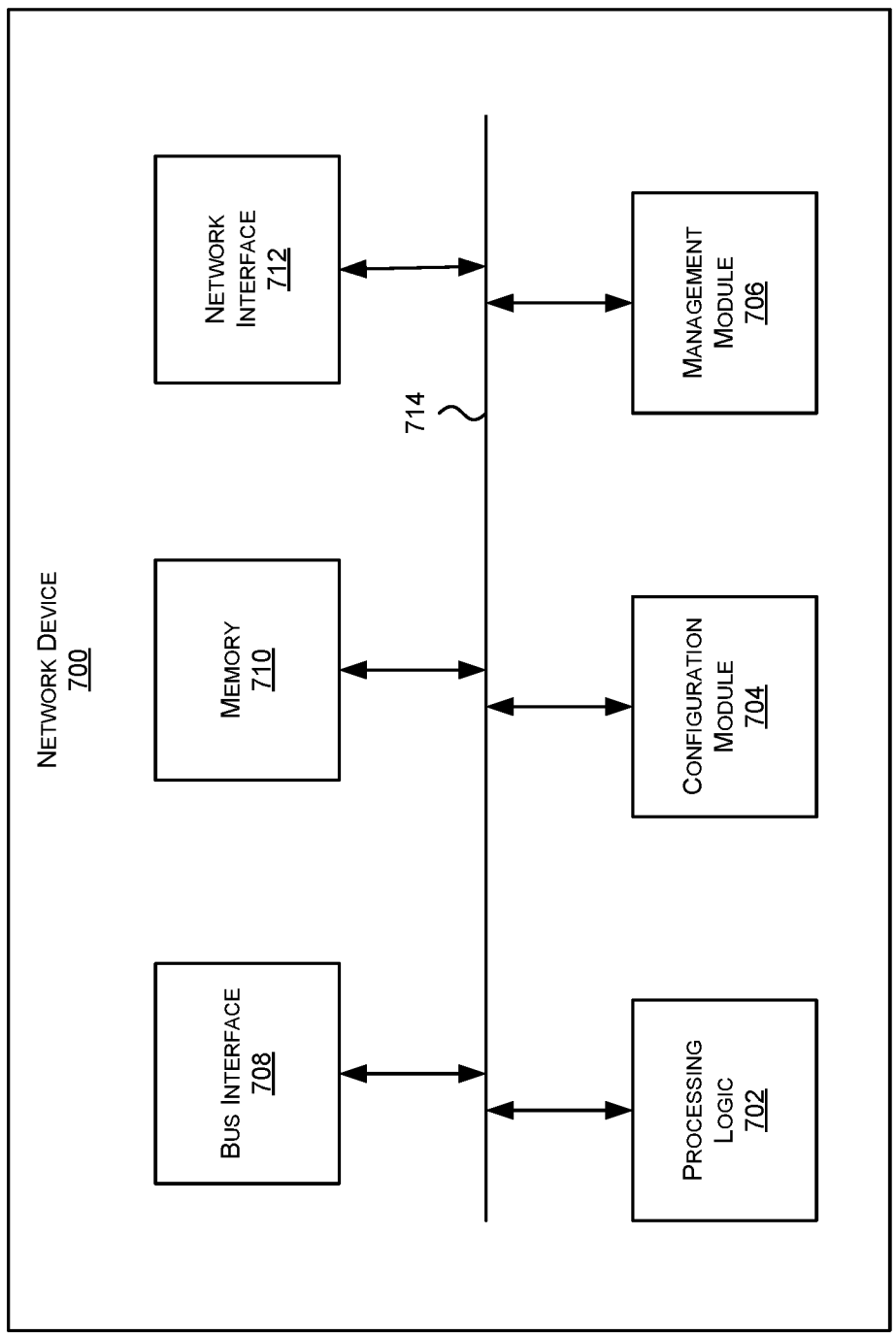
FIG. 7 illustrates an example of a network device, according to certain aspects of the disclosure.

FIG. 7 illustrates an example of a network device 700. Functionality and/or several components of the network device 700 may be used without limitation with other embodiments disclosed elsewhere in this disclosure, without limitations. For example, the network device 700 can be an example of the I/O device 204 or the I/O device 314. In some embodiments, some of the components of the network device 700 can be part of the source device 202 or the target device 206. A network device 700 may facilitate processing of packets and/or forwarding of packets from the network device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 700 may be the recipient and/or generator of packets. In some implementations, the network device 700 may modify the contents of the packet before forwarding the packet to another device. The network device 700 may be a peripheral device coupled to another computer device, a switch, a router or any other suitable device enabled for receiving and forwarding packets.

In one example, the network device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The network device 700 may include additional modules, not illustrated here, such as components discussed with respect to the nodes disclosed in FIG. 8. In some implementations, the network device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network device 700, while in other cases some or all of the memory may be external to the network device 700. The memory 710 may store an operating system comprising executable instructions that, when executed by the processing logic 702, provides the execution environment for executing instructions providing networking functionality for the network device 700. The memory may also store and maintain several data structures and routing tables for facilitating the functionality of the network device 700.

In some implementations, the configuration module 704 may include one or more configuration registers. Configuration registers may control the operations of the network device 700. In some implementations, one or more bits in the configuration register can represent certain capabilities of the network device 700. Configuration registers may be programmed by instructions executing in the processing logic 702, and/or by an external entity, such as a host device, an operating system executing on a host device, and/or a remote device. The configuration module 704 may further include hardware and/or software that control the operations of the network device 700.

In some implementations, the management module 706 may be configured to manage different components of the network device 700. In some cases, the management module 706 may configure one or more bits in one or more configuration registers at power up, to enable or disable certain capabilities of the network device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the network device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 700 may include multiple network interface modules, each configured to communicate with a different network. For example, in these implementations, the network device 700 may include a network interface module for communicating with a wired Ethernet network, a wireless 802.11 network, a cellular network, an Infiniband network, etc.

The various components and modules of the network device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

Figure 8:
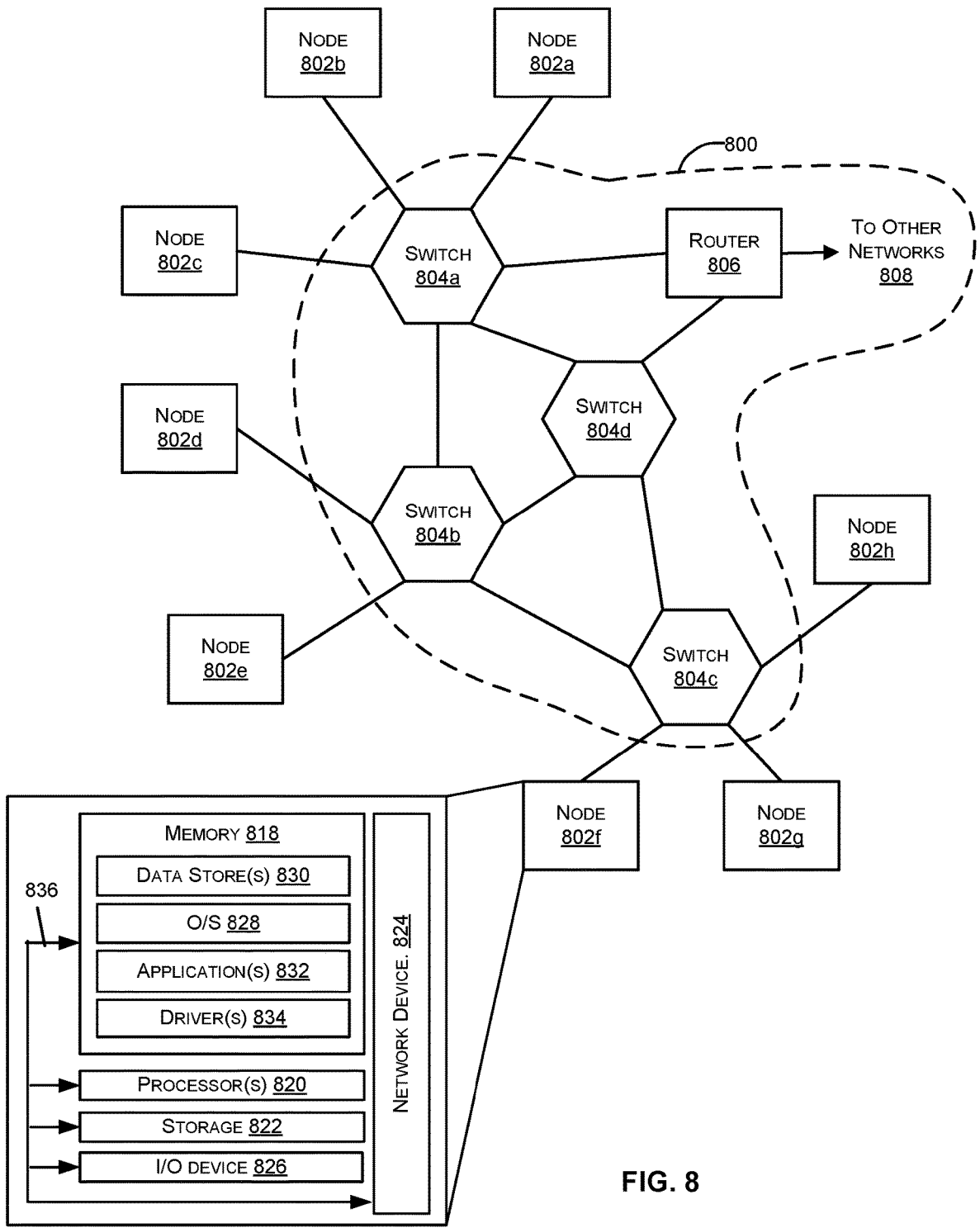
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of network devices 700 of FIG. 7, such as nodes comprising the network device, switches and routers. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device 700 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more network devices 700 for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers. In various examples, the source device 202 and the target device 206 can be part of the same node or different nodes in the nodes 802a-802h.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800. The network device(s) 824 of FIG. 8 may include similar components discussed with reference to the network device 700 of FIG. 7.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 708 may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system comprising:
   an input/output (I/O) device;
   a source device including:
      a source I/O interface coupled to the I/O device; and
      a source memory controller configured to access a source memory where data for a virtual machine instance and tag data are stored, the tag data comprising metadata associated with the data for the virtual machine instance; and
   a target device coupled to the source device, the target device including a target memory controller configured to access a target memory,
   wherein the source device is configured to:
      receive a first read request from the I/O device on the source I/O interface, wherein the first read request is a request to receive the data for the virtual machine instance and comprises a data migration indication indicating that the data for the virtual machine instance is being migrated;
      generate a first command in response to the first read request, wherein the first command is configured to cause the data for the virtual machine instance to be transferred from the source memory to the source memory controller, and wherein the first command is further configured, based on the data migration indication, to cause the tag data to be transferred from the source memory to a source tag buffer of the source memory controller;
      store the tag data in the source tag buffer for transmission separately from the data for the virtual machine instance;
      transmit the data for the virtual machine instance from the source memory controller to the target device via the source I/O interface;
      receive a second read request after transmitting the data for the virtual machine instance, wherein the second read request is a request to receive the tag data; and
      transmit the tag data from the source tag buffer to the target device, via the source I/O interface and in response to the second read request, and
   wherein the target device is configured to:
      receive the data for the virtual machine instance based on the first read request;
      receive the tag data based on the second read request; and
      write the data for the virtual machine instance together with the tag data into the target memory, via the target memory controller to complete a data migration for the virtual machine instance.

2. The system of claim 1, wherein the target device is configured to store the tag data in a target tag buffer in the target device before being written into the target memory.

3. The system of claim 1, wherein the tag data includes memory tagging extension (MTE) bits.

4. The system of claim 1, wherein the source memory includes a plurality of memory devices, and the tag data is stored in a separate memory device than the data for the virtual machine instance.

5. A computer-implemented method, comprising:
   receiving, by a computing device, a first read request from an input/output (I/O) device, wherein the first read request is a request for stored data in a memory accessible to the computing device, the first read request comprising a data migration indication indicating that the stored data is being migrated;
   generating, by the computing device, a first command in response to the first read request, wherein the first command is configured to cause the stored data to be transferred from the memory to a memory controller of the computing device, and wherein the first command is further configured, based on the data migration indication, to cause tag data to be transferred from the memory to a tag buffer of the computing device, the tag data comprising metadata associated with the stored data;
   storing, by the memory controller, the tag data in the tag buffer for transmission separately from the stored data;
   transmitting, by the computing device, the stored data to the I/O device;
   receiving, by the computing device, a second read request from the I/O device after transmitting the stored data, wherein the second read request is a request to receive the tag data; and
   transmitting, by the computing device, the tag data from the tag buffer to the I/O device in response to the second read request.

6. The computer-implemented method of claim 5, wherein the I/O device transmits the stored data and the tag data to a target device, and wherein the target device writes the stored data together with the tag data to a target memory to complete a data migration.

7. The computer-implemented method of claim 6, wherein the target device receives the tag data separately from the stored data, and stores the tag data in a target tag buffer of the target device.

8. The computer-implemented method of claim 5, wherein the data migration indication is embedded in an address of the first read request.

9. The computer-implemented method of claim 5, wherein the I/O device is a peripherical component interconnect (PCI) device, and the data migration indication is implemented using a bus device function.

10. The computer-implemented method of claim 5, wherein the memory controller receives the stored data together with the tag data from the memory.

11. The computer-implemented method of claim 5, wherein the memory controller receives the stored data and the tag data separately from different memory devices implemented in the memory.

12. The computer-implemented method of claim 5, wherein the first read request is received by an I/O interface of the computing device, and the I/O interface generates the first command as a data migration command for the memory controller in response to determining, based on the data migration indication, that the stored data is being migrated.

13. The computer-implemented method of claim 5, wherein the tag data includes at least four bits of the tag data per sixteen bytes of the stored data in the memory.

14. The computer-implemented method of claim 5, wherein the tag data includes memory tagging extension (MTE) data.

15. The computer-implemented method of claim 5, wherein the stored data and the tag data are transmitted to the I/O device as part of migrating a virtual machine instance from the computing device to a target device.

16. A computer-implemented method comprising:
    transmitting, by an input/output (I/O) device, a first read request to a source device to initiate a data migration to move stored data from a source memory to a target memory, wherein the first read request is a request to receive the stored data and comprises a data migration indication indicating that the stored data is being migrated;
    receiving, from the source device, the stored data based on the first read request;
    transmitting, by the I/O device, a second read request to the source device after receiving the stored data, wherein the second read request is a request to receive tag data, the tag data comprising metadata associated with the stored data, and wherein the data migration indication causes the source device to transfer the tag data from the source memory prior to the second read request;
    receiving, from the source device, the tag data based on the second read request; and
    transmitting, by the I/O device, the stored data and the tag data to a target device, wherein the target device writes the stored data together with the tag data into the target memory to complete a data migration.

17. The computer-implemented method of claim 16, wherein the data migration indication is provided through an address alias included in the first read request.

18. The computer-implemented method of claim 16, wherein the first read request is transmitted using a bus device function designated for the data migration.

19. The computer-implemented method of claim 16, wherein each of the source device and the target device includes a tag buffer to temporarily store the tag data during the data migration.

20. The computer-implemented method of claim 16, wherein the data migration is a live migration of a virtual machine instance.

* * * * *